United States Patent [19]
Musil et al.

[11] Patent Number: 5,348,143
[45] Date of Patent: Sep. 20, 1994

[54] SPLICE ASSEMBLY FOR CONNECTING BELT ENDS

[75] Inventors: Edward C. Musil; William J. Daniels, both of Orland Park, Ill.

[73] Assignee: Flexible Steel Lacing Company, Downers Grove, Ill.

[21] Appl. No.: 61,163

[22] Filed: May 13, 1993

[51] Int. Cl.$^5$ .............................................. B65G 15/30
[52] U.S. Cl. ................... 198/844.2; 474/255; 24/33 F
[58] Field of Search ...................... 198/844.2; 474/253, 474/255, 257; 24/33 F, 33 P, 33 M, 31 B

[56] References Cited

U.S. PATENT DOCUMENTS

| | | | |
|---|---|---|---|
| 3,084,408 | 4/1963 | Ireland | 474/257 X |
| 4,212,094 | 7/1980 | Pray | 474/257 X |
| 4,625,369 | 12/1986 | Musil | 24/33 B |
| 5,099,548 | 3/1992 | Loosli | 24/38 |

*Primary Examiner*—Cheryl L. Gastineau
*Attorney, Agent, or Firm*—Fitch, Even, Tabin & Flannery

[57] ABSTRACT

A splice assembly is provided for connecting together a pair of belt ends by a plurality of short lengths of cable in a manner which allows for troughing of the belt across its width at the connected belt ends. The lengths of cable engage at one of their ends to a first belt end, and engage at their other end to a second belt end, whereby the cables bear a tensile load along their axis. Belt fasteners having slots for engageably receiving the ends of the cables are affixed to both of the first and second belt ends to be joined along the entire width of the belt ends. There is a small gap between adjacent belt fasteners which allows for flexion of the belt thereat to allow for the aforementioned troughing of the belt. In accordance with one aspect of the invention, the cable ends engage with respective belt fasteners in a manner which prevents movement of the cable ends relative to the belt fasteners during operation of the belt. A cable splice is provided in which a support slab, which protects the cables against abrasion or being snagged and which also maintains a plurality of cables in spaced, generally parallel relation to allow a group of cables to be picked up together and inserted into slots in the belt fasteners together. The opposite ends of the support slab, from which the ends of the cables protrude, are shaped and positioned such as being curved inwardly to accommodate the leading end of the belt fasteners at which the cable engages therewith, to shield this region from particulate sifting. The slots in the belt fasteners are preferably positioned on the underside of the belt fasteners to further minimize particulate sifting.

22 Claims, 6 Drawing Sheets

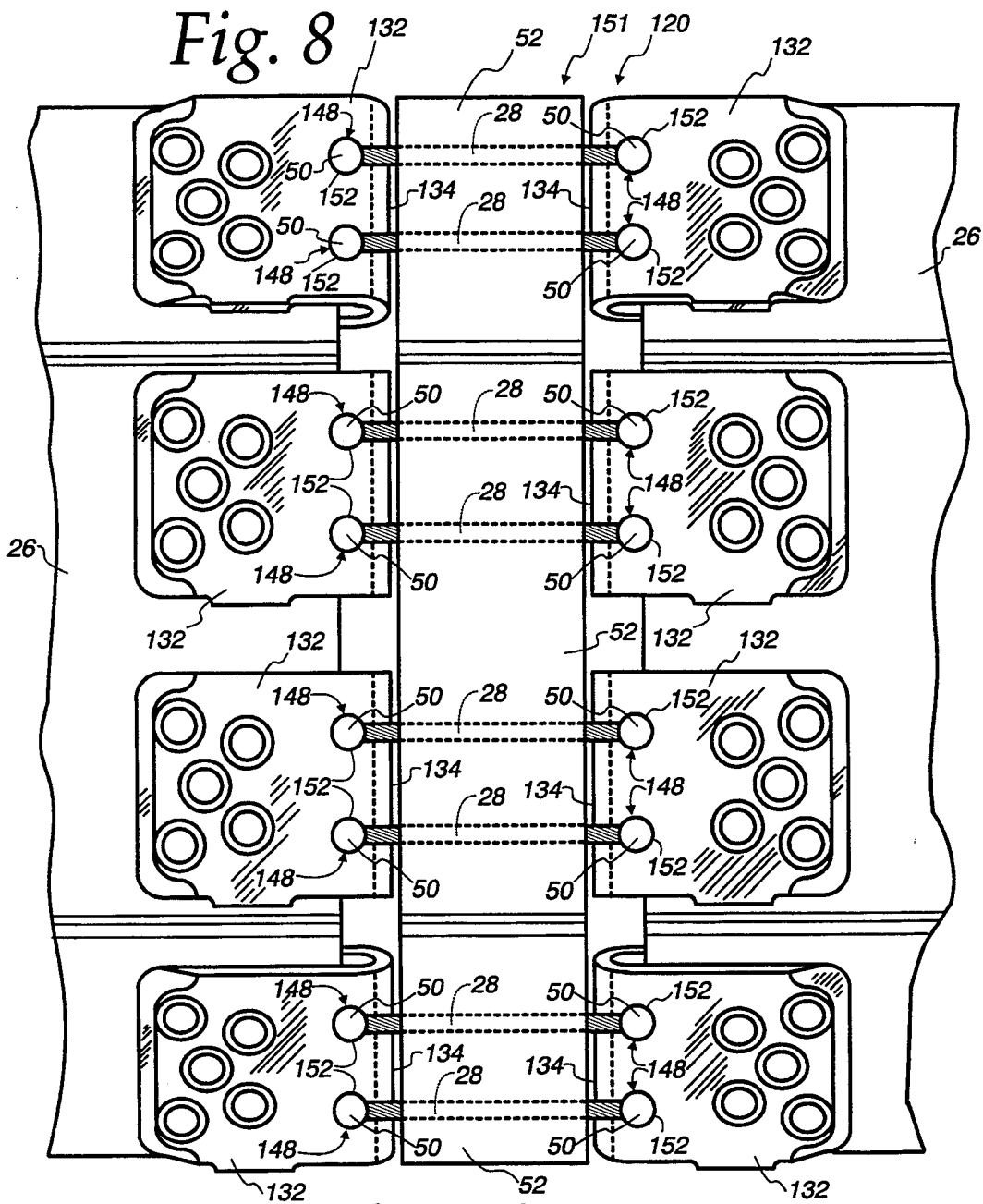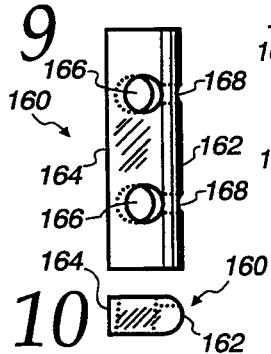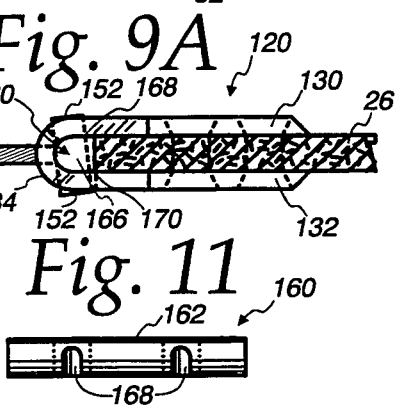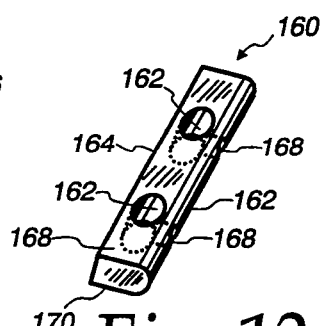

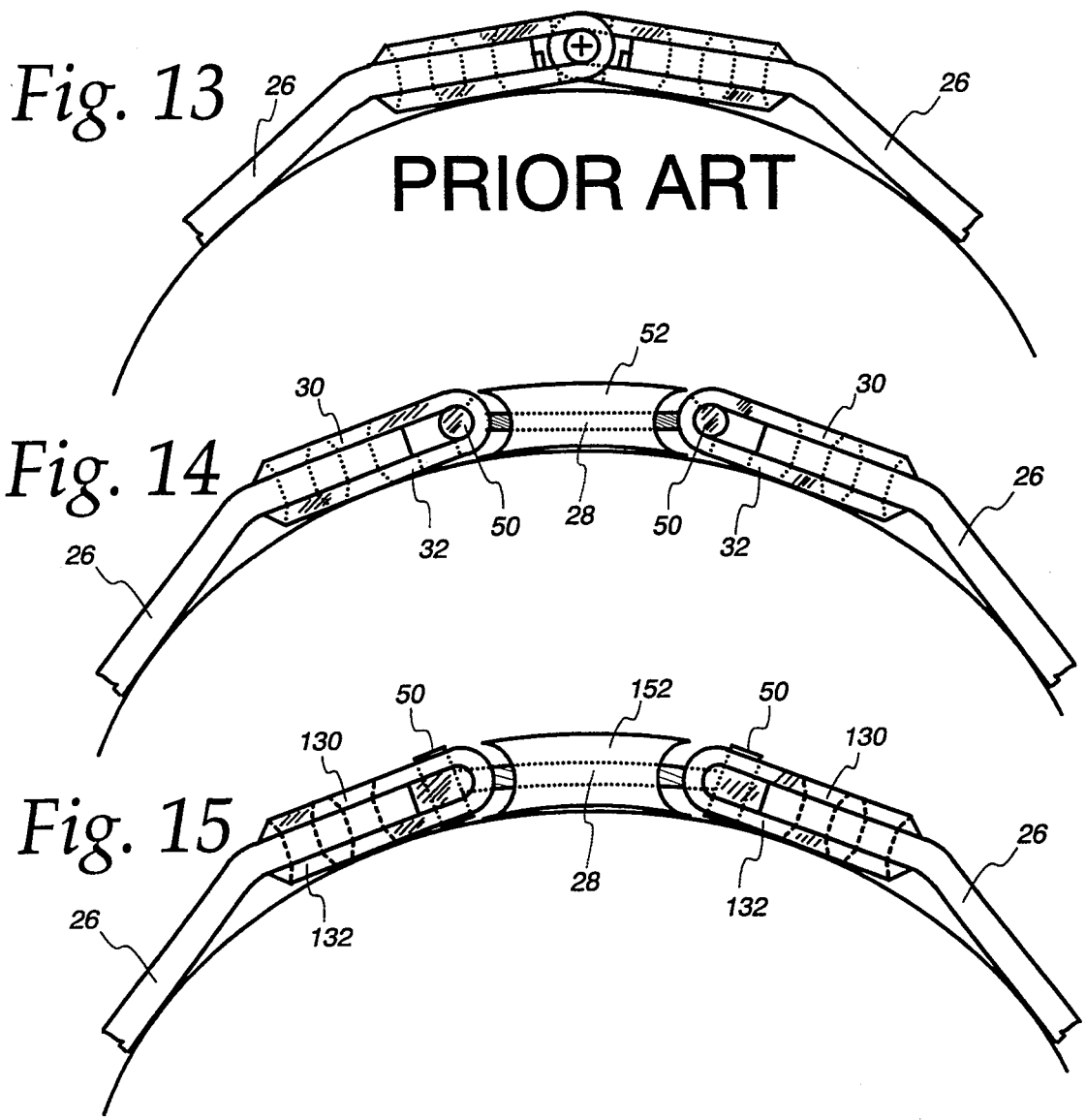

SPLICE ASSEMBLY FOR CONNECTING BELT ENDS

FIELD OF THE INVENTION

This invention relates to splice assemblies for conveyor belts or the like, and more particularly, to a replacement for a hinge pin used to join hinge-type of belt fasteners together.

BACKGROUND OF THE INVENTION conveyor belts often come in relatively large widths, for example, 24, 48, 60 or more inches in width. The belts are often troughed so that the longitudinal sides of the belt are canted upwardly and outwardly from a lower central section to contain the conveyed material so as to prevent the material from falling off the sides of the belt. Commonly used hinged belt fasteners are joined to opposite ends of the belt, and hinge loops are interdigitated to form a common bore into which is inserted a hinge pin that prevents the hinge loops from separating. The hinge loops exert transverse shear forces on the elongated pin, which is in one piece when inserted into the bore. When the belt is troughed, the flexible hinge pin, which is often a length of flexible cable, bends at the locations of the canted side sections and the lower center section of a troughed belt. These cable-like hinge pins are constructed to withstand large, tensile loads; but when used as hinge pins, are subject to transverse shear loads to which the cable is not well suited. The transverse loads from the belt loops tend to cut or wear grooves in the hinge pin at the hinge loop locations across the splice section that usually preclude a removal of the hinge pin after it has been in use for a while.

The troughed hinge pin usually breaks into at least three pieces with the center piece being difficult to remove. Often the ends of the hinge pins are struck by equipment or otherwise damaged so that there is not a good end to grip to pull the hinge pin from the loops of the interdigitated belt fastener loops. Event if there is a good end to grip and the pin is broken, only the outer end section will be gripped and pulled. Thus, it is often necessary to cut the belt fasteners off the belt end when a hinge pin cannot be removed. Accordingly, the conventional cable hinge pin used with hinge-type belt fasteners is not easy to replace when it has been in use for a while.

Often in coal mines or in material handling applications, the belt length is desired to be changed relatively frequently either to make the belt longer or to make it shorter. Usually, a section of belt is either added or subtracted. This belt section is usually connected by hinge belt fasteners with a flexible hinge cable-type pin which, if broken, is very difficult, if not impossible, to remove. Thus, there is a need to provide an improved hinge pin replacement.

The belt fasteners are hinged as the endless belts are wrapped about pulleys or drums when travelling from an upper run to a lower run. For example, the belt fasteners travel about a nine inch diameter drum, and are expected to fit the curve of such a diameter much in the manner that the belt does.

A particular problem that needs to be addressed with these types of belt fasteners is that of preventing sifting of fines or fine particulate through the splice formed by the belt fasteners and the hinge pin. Thus, the hinge pin replacement should not be such an open device that fines fall readily through the splice. Also, belt scrapers often scrape the top and/or the bottom of the conveyor belt, and the hinge pin replacement should not be damaged by such scrapers as it passes over the scrapers. The material being conveyed is often very abrasive, and the hinge pin replacement should be capable of withstanding abrasion or wear.

Solid rod hinge pins have been used rather than the flexible, cable hinge pins, with the solid rod hinge pins extending through the passageway defined by the overlapping fastener hoops. However, the solid rods have been found undesirable since they do not provide the requisite flexibility necessary to flex a belt across its width to form a trough, as required in many conveyor belt applications.

SUMMARY OF THE INVENTION

In accordance with the present invention, a cable splice assembly is provided for interconnecting a pair of belt ends and includes a cable splice extending between belt fasteners on the ends of the belt, with the cable splice having a plurality of cables extending between the belt ends in a manner which allows for flexing and troughing of the belt at the interconnected belt ends. A plurality of spaced belt fasteners are affixed in spaced relation along the widths of respective belt ends to be joined, with the ends of each of cable splice being joined to respective belt fasteners on opposite belt ends to interconnect the pair of belt ends. The use of individual spaced, adjacent belt fasteners allows bending of the belt between adjacent belt fasteners and thereby allows troughing of the continuous belt across its width. The belt ends are interconnected by a plurality of cables, with each of the cables bearing a tensile load to hold the belt ends together. Thereby, the belt ends are securely interconnected to form a continuous belt, with no cable being subjected to a heavy, transverse loading as in the case of a conventional hinge pin.

In accordance with another aspect of the present invention, the cable splice has the cables buried in a splice body or slab such that the cables are not exposed to be snagged or caught by material or the conveyor or equipment such as belt scrapers. The cable splice has the cables substantially encased in a slab of resilient material with only the cable ends extending outward of the support slab, whereby the support slab shields the cables from being snagged or from being abraded. The plurality of cables are maintained generally parallel to one another by the support slab with the support slab allowing cables to be picked up and placed at the belt ends in groups rather than individually. Finally, the sides of the support slab from which the cables ends extend between the opposed sets of belt fasteners and are curved over the belt fastener loops to provide a support slab that covers substantially the space between the belt ends to reduce the space available for fines to sift through the belt splice.

The invention will become more fully understood as the description proceeds and the features of novelty which characterize this invention will be pointed out with clarity.

BRIEF DESCRIPTION OF THE DRAWINGS

In the drawings, wherein like elements are referenced alike:

FIG. 8 is a bottom view of the splice assembly of FIG. 6;

FIG. 9 is a plan view of an insert for guiding the end members of the cables;

FIG. 10 is an end elevational view of the insert of FIG. 9;

FIG. 11 is a side elevational of the insert of FIG. 9;

FIG. 12 is a perspective view of the insert of FIG. 9;

FIG. 13 is a side elevational view of a prior art splice assembly, shown with the belt passing around a curved surface.

FIG. 14 is a side elevational view of the splice assembly of FIGS. 1-5, shown with the belt passing around a curved surface;

FIG. 15 is a side elevational view of the splice assembly of FIGS. 6-8, shown with the belt passing around a curved surface;

FIG. 16 is a side elevational view of a cable incorporating various features of the present invention; and FIG. 17 is a plan view of the cable of FIG. 11.

DETAILED DESCRIPTION OF THE PREFERRED EMBODIMENTS

Figure 1:
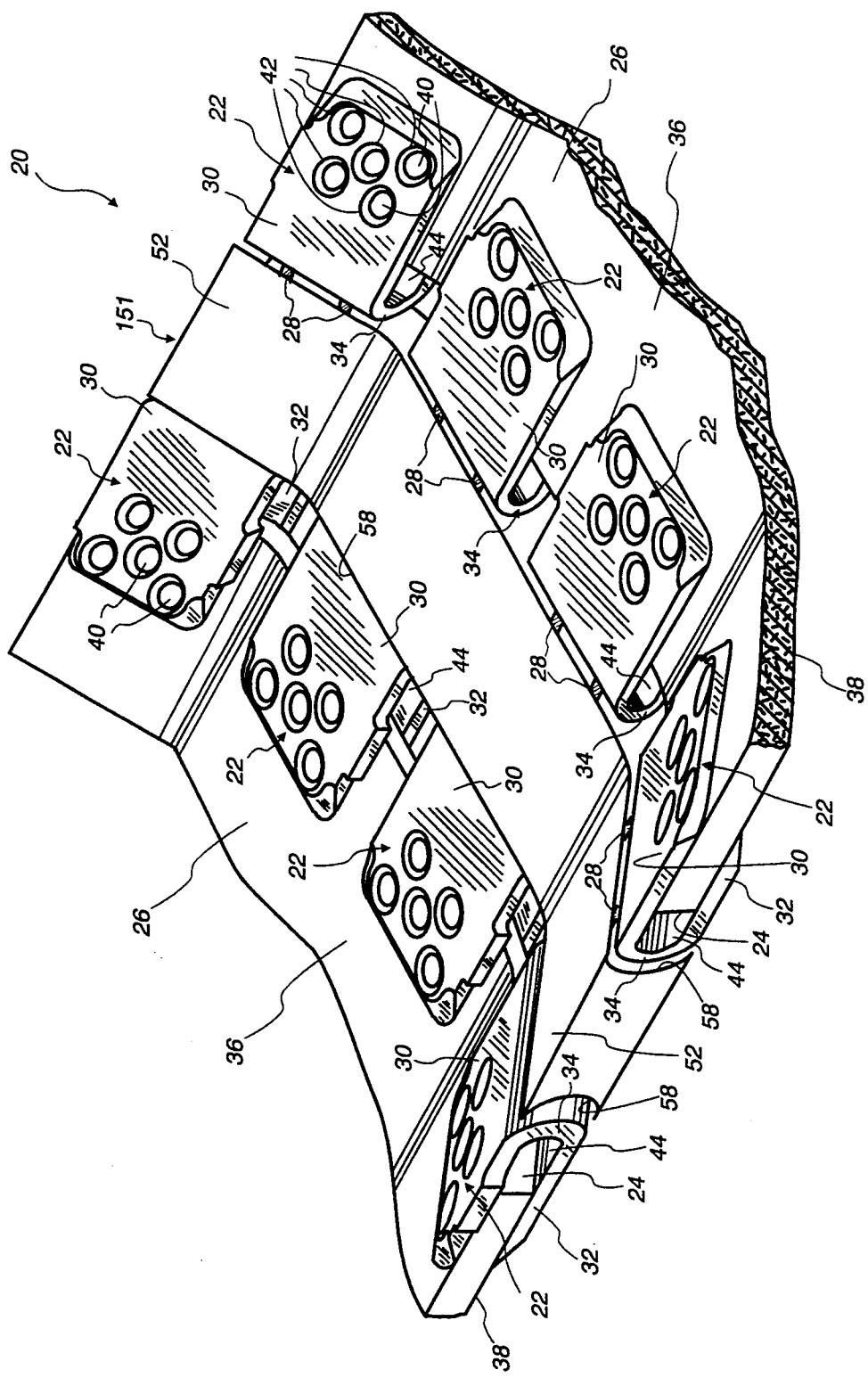
FIG. 1 is a fragmentary, perspective view of a splice assembly embodying various features of the present invention, shown connecting two troughed belt ends.
Figure 2:
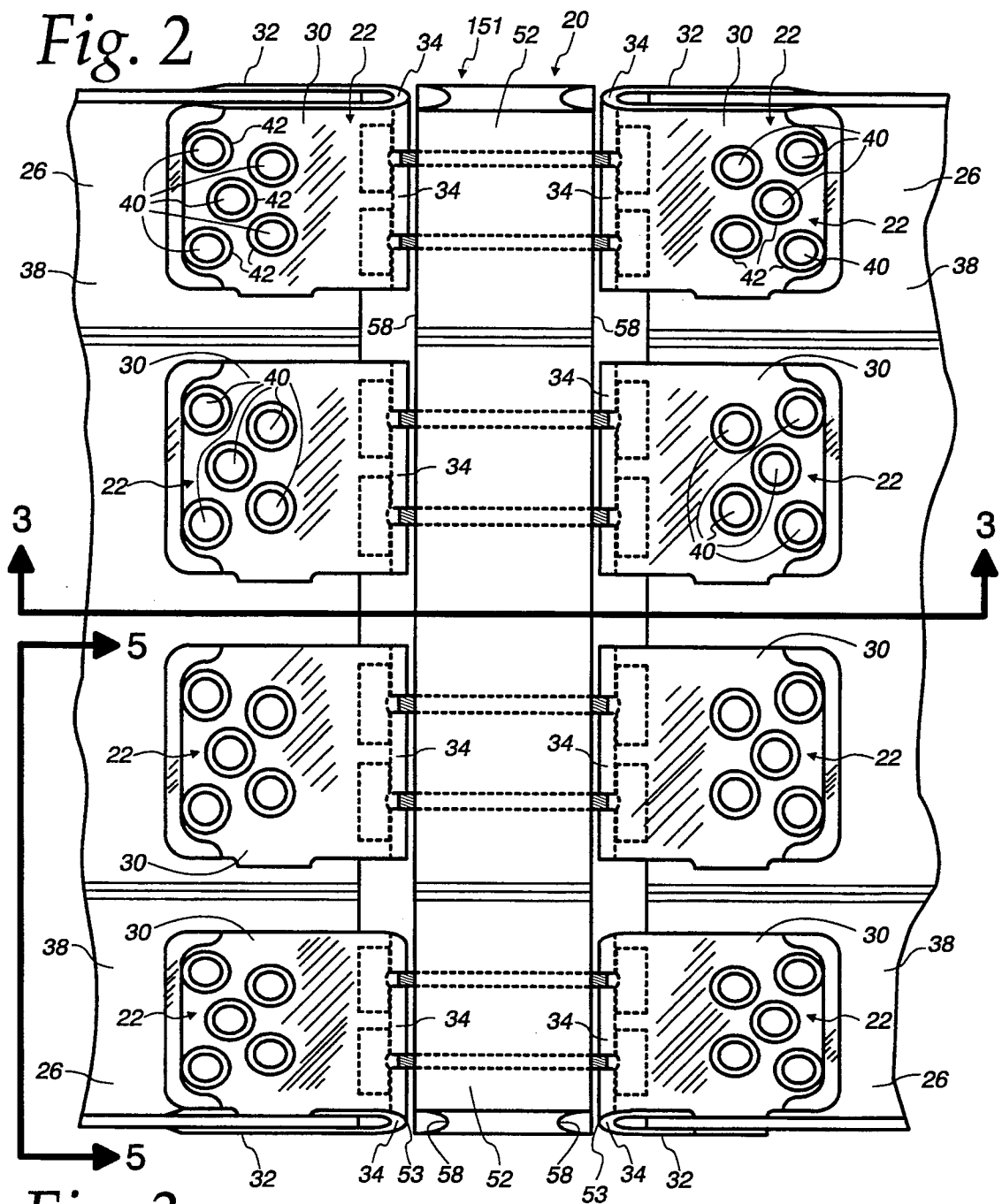
FIG. 2 is a top plan view of the splice assembly of FIG. 1.

A first embodiment of a splice assembly embodying various features of the present invention is illustrated in FIGS. 1-5 and 15, and referred to generally by reference numeral 20. A second embodiment of a splice assembly embodying various features of the present invention is illustrated in FIGS. 6-8 and 16, and referred to generally be reference numeral 120. A prior art belt fastener is illustrated in FIG. 13.

With initial reference to the splice assembly 20 of the first embodiment, illustrated in FIGS. 1-4 and 9, the splice assembly 20 comprises a plurality of belt fasteners 22 affixed across the width of respective, opposing ends 24 of the belt 26 to be joined, with a plurality of short cables 28 spanning respective cable splice 151 having a pair of opposing belt fasteners 22.

In the illustrated embodiment, each of the belt fasteners 22 has a body made of metal and each comprises an upper plate 30 and a lower plate 32 interconnected by an integral loop 34. With reference to FIG. 1, which illustrates the upper side of the belt 26, the entire interior surface of the upper plate 30 is positioned flush against the upper side 36 of the belt 26, and the entire interior surface of the lower plate 32 is positioned flush against the lower side 38 of the belt 26. The upper and lower plates 30 and 32 are pressed tightly against the belt 26 by a plurality of rivets 40 to fasten the belt fasteners 22 to their respective belt ends 24.

Both the upper and lower plates 30 and 32 of the belt fasteners 22 include a plurality of apertures or holes 42 therein, with the holes 42 in the upper plate 30 being in registration with the holes 42 in the lower plate 32. Fasteners such as rivets 40 are passed through holes 42 in the upper plates 30 of the belt fasteners and penetrate the belt and then are passed through the holes 42 in the lower plates 32 of the belt fasteners 22 and serve to fasten the belt fasteners 22 securely to the belt 26. Other fasteners such as staples, bolts or the like could be used in lieu of rivets.

The rivets 40 have enlarged preformed heads with shanks that are inserted from the upper side 36 of the belt 26 and the upper and lower plates 30 and 32 pressed together about the belt 26 as the rivet heads are pressed against the upper plate 30 of the belt fasteners 22. With the belt fasteners 22 and rivets 40 secured in this manner, the leading ends of the rivets 40 are flared outwardly to form enlarged rivet ends to maintain the belt fasteners 22 securely fastened to the belt 26 near respective belt ends 24. Various methods of attaching belt fasteners to belt ends are disclosed in the prior art, and the invention is not limited to any particular method for attaching belt fasteners to belt ends.

As best seen in FIG. 1, in the illustrated embodiment the belt ends 24 do not extend into the loop 34 portion of the belt fasteners 22, so that there is an opening or gap 44 between the belt ends 24 and the rounded internal extremity of the loop portion 34 of the belt fasteners 22. The belt fasteners 22 have slots 48 formed in the lower side 49 of the loop portion 34 thereof. The shape of the slots 48 corresponds to the shape of end members 50 integral with the cable lengths 28, for reasons which are delineated below.

In the illustrated embodiment, the cable splice 151 is employed to interconnect the belt fasteners 22 of opposing belt ends. The cable splice 151 comprises a plurality of short cables 28 of generally equal length that are supported in parallel relation to one another by a rectangular supporting body or slab 52. The cables 28 extend through the slab 52, with the opposite ends of each of the cable 28 protruding external of the support slab 52. The slab 52 serves several functions. In addition to protecting the cables 28 from nicks and cuts and being abraded by conveyor supports, belt scrapers or the like or from beginning snagged on equipment, the slab 52 also maintains spacing and orientation of the plurality of cables 28 therethrough. Additionally, the slab 52 is preferably sized and shaped to prevent sifting through the splice assembly as will be explained. The slab is preferably made of a tough, flexible plastic material, such as urethane, and is easily bendable about the drums at the ends of the conveyor runs, as shown in FIGS. 13-15, and is molded about the cables 28. Each of the cables 28 has end members 50 which are cylindrical in shape in the illustrated embodiment, but may be any of a wide variety of shapes. A cylindrical end member 50 is attached to each of the ends of the cables 28, so that each cable 28 has an end member 50 at both of its ends. The support slab 52 is preferably proportioned and configured such that there is a small amount of space between the end members 50 and the support slab 52, with there being only a small amount of cable 28 exposed between the end members 50 and the support slab 52.

As best seen in FIG. 17, the end members 50 are joined to the cable 28 by cable wire ends 28a that are spread apart from the spirally wound wires that make up the cable; and these splayed wire ends 50a are spaced in the cable end members 50 that are molded on to the wire ends 28a. By way of example only, the cables 28 may be 0.1875 inch diameter steel wire rope, 7×7 strand core or equivalent; and the end members 50 are made of zinc or brass alloy and are molded on the splayed cable ends 28a. Other methods of attachment of the end members to the cable may be used. The splaying or spreading of the cable wires in the molded end members provides a greater resistance to the cable pulling from the end members under high tension loading. By way of example only, the illustrated end members are 0.25 inch in diameter and 0.600 inch in height. The cables illustrated in FIG. 17 are about several inches in length, the illustrated cables being two inches in length from the center of the left end member 50 to the center of the right end member 50. Manifestly, the materials and dimensions of the cables and end members 50 may vary substantially from those given herein, which are only by way of example.

The aforementioned slots 48 in the loop portions 34 of the belt fasteners 22 are provided to engagingly receive respective end members 50. That is, after a plurality of belt fasteners 22 are affixed along the entire width of the two belt ends 24 to be joined, each of the end members 50 protruding from one side of the support slab 52 are inserted into respective slots 48 of the belt fasteners 22 on one of the belt ends 24 and accommodated within the gap 44. Thereafter, each of the end members 50 protruding from the opposite side of the support slab 52 are inserted into respective slots 48 of the belt fasteners 22 on the other belt end 24, with the belt ends 24 thereby being joined together by the lengths of cable 28.

Additional protection of the cable splice 151 from accelerated wear due to abrasion or contact with the load being carried is realized by having the slots 48 being formed in the lower plate 32 of the belt fastener 22, with there being no slots formed in the upper plate 30. Since, during normal operation, the upper plates 30 are exposed to the load being carried, the absence of communication of the end members 50 to the load significantly decreases abrasion wear of the splice assembly 20.

Figure 4:
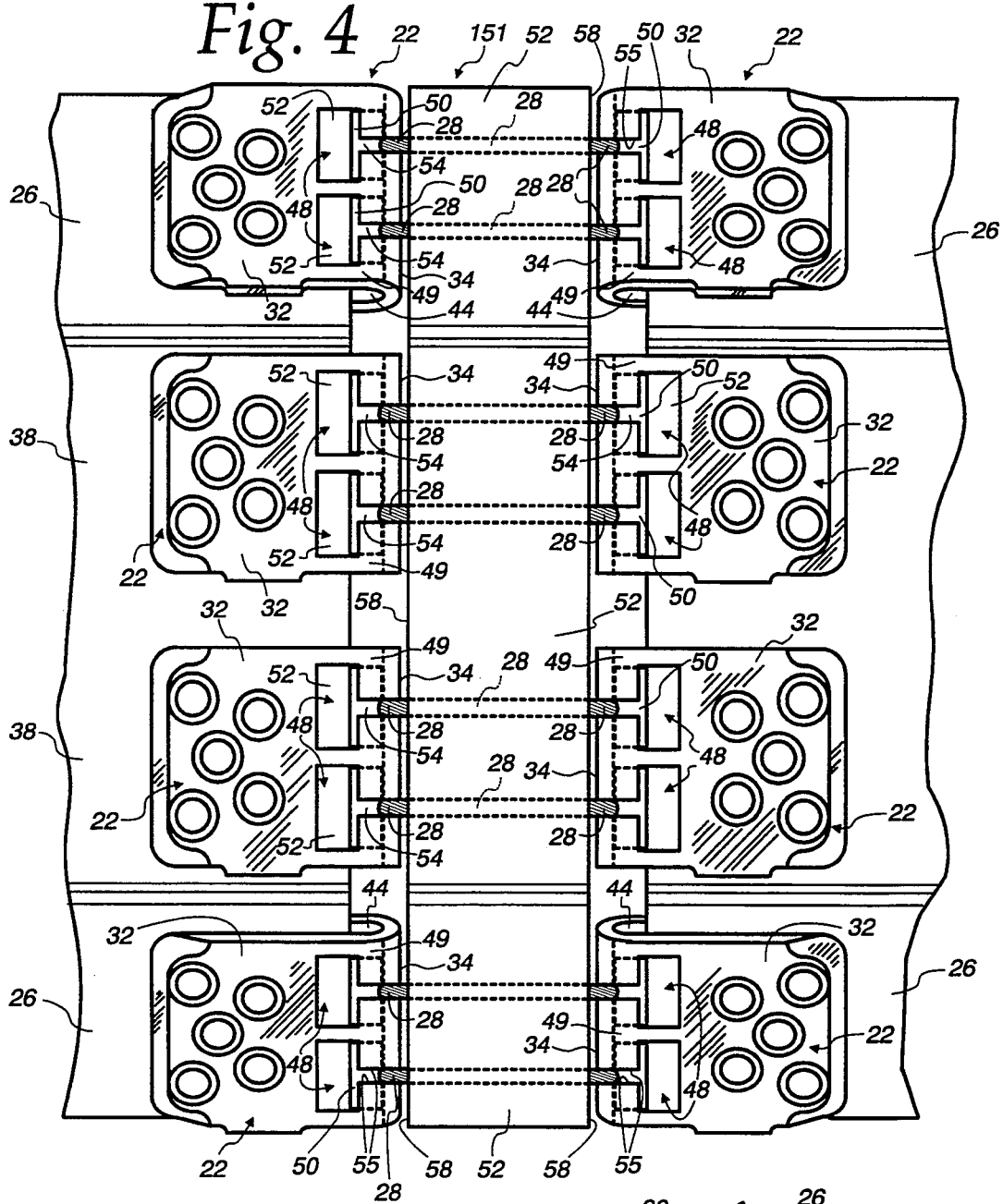
FIG. 4 is a bottom view of the splice assembly of FIG. 1, showing the opposite side of the splice assembly from that shown in FIG. 2.
Figure 5:
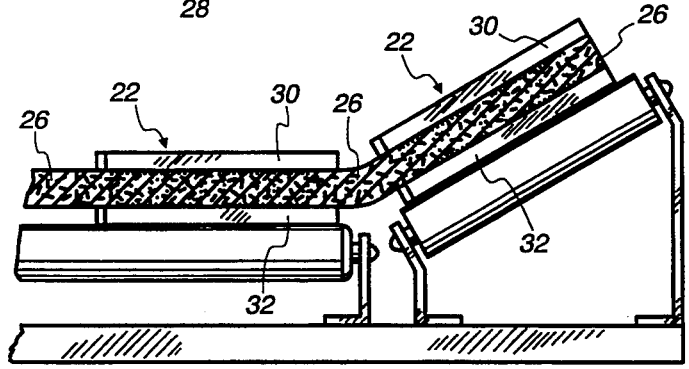
FIG. 5 is a sectional view of the splice assembly taken along line 5—5 of FIG. 2 showing the belt troughed by idlers.

As best seen in FIG. 4, each of the slots 48 comprises a rectangular portion 52 proportioned to receive a respective cylindrical end member 50 therein, with a narrow slot portion 54 in communication with the end-member-receiving rectangular portion 52 for accommodating the cable 28. The narrow slot portion 54 extends from the rectangular portion 52 of the slot 48 and extends over a substantial length of the loop portion 34 of the belt fasteners 22. That is, upon insertion of a cylindrical end member 50 into its respective rectangular slot portion 52, the cable 28 integral with that end member 50 is received in the narrow portion 54 of the slot 48. There are no rectangular slots 48 in the upper plate 30 of the belt fasteners 22 to minimize wear associated with sifting of particulate through the splice assembly 20, as discussed further below.

The rectangular slots 52 are spaced from the rounded internal extremity of the loop portion 34 of the belt fasteners 22 so that after passing through the rectangular slot 48 of a belt fastener 22 into the gap 44, and being pulled in the direction of the internal extremity of the loop portion 34 of the belt fasteners 22, the cylindrical end members 50 are slid into abutment with the internal extremity of the loop portion 34, whereat the end members 50 are out of alignment with the rectangular slots 52 and therefore do not slide out of their respective rectangular slots during operation of the belt 26. Thereby, engagement between each of the end members 50 of the cables 28 and the respective belt fasteners 22 is maintained. Accordingly, each of the cables 28 are connected at their opposite ends to respective belt fasteners 22 in a manner which maintains engagement of the end members 50 of the cables 28 with respective belt fasteners 22 throughout belt usage.

Figure 3:
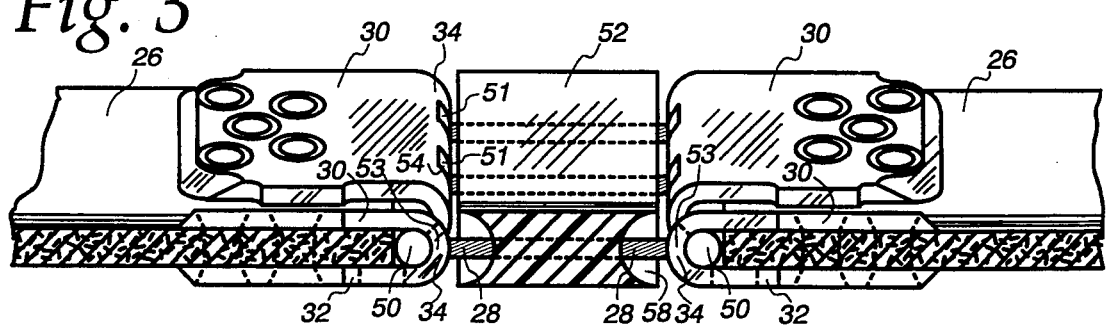
FIG. 3 is a sectional view of the splice assembly taken along line 3-3 of FIG. 2.

The narrow slot portions 54, which receive respective cables 28 therein, allow the cables 28 to move freely within their respective narrow slot portions 54. The narrow slots 54 extend from the larger rectangular slots 52 in the lower side 49 of the loop portion 34, with the narrow slots 54 extending approximately three-quarters of the way around the arcuate loop portion 34 of the belt fastener 22 to terminate at an endwall 51 (FIG. 3).

During its return run, the lower returning run of the belt 26 may be straight or flat with the belt fasteners 22 on either side of the support slab 52 both being generally horizontal. During the upper run of the conveyor, the belt 26 may be troughed as in FIG. 1, with the belt being flexed in between adjacent belt fasteners 22. When the belt goes about the driving drum or idler drum, the cable splices may conform to the drum surface as shown in FIGS. 13–15, with the upper side 36 of the belt 26 being radially outward and the lower side 38 of the belt 26 being radially inward. When the splice assembly 20 changes its position, each of the cables 28 may be swung within a respective narrow slot 54 in the direction of the rectangular slot 52. More specifically, when passing over a curved path of travel, such as when traveling about an idler drum, the cables will conform to the surface of the drum and the cable end members 50 should not pivot in the gaps 44.

During normal operation, the cables 28 slide between a horizontal position at which the cable extends outward from the internal extremity of the loop portion 34, generally parallel to the upper and lower plates 30 and 32, at one extremity, and a position somewhere between this horizontal position and a vertical position at which the cable extends perpendicularly from the lower plate side of the narrow slot 54, at its other extremity. Hence, it is generally not required that the narrow slots 54 extend around the loop portion 34 of the belt fasteners 22 past the midarc of the internal extremity of the belt fasteners 22. However, as a precaution against wear of the cables 28 in the event of slight reverse-flexing of the belt 26, whereby the cables 28 are swung in a direction opposite the rectangular slots 52, slightly past horizontal, the narrow slots 54 extend approximately three-quarters of the way around the loop 34 to endwalls 51.

The presence of particulate within the gap 44 of the belt fasteners 22 would accelerate abrasive wearing of the splice assembly 20. By having the slots not extending into the upper plate of the belt fasteners, there is less likelihood that sifting material will move into the gap 44. Often the sifting material may be sand, coal, grit or other generally abrasive material.

To reduce the sifting of particulate through the cable splice assembly, the sides 58 (FIG. 7) of the support slab 52 extend to and curve about the curved, leading ends 53 of the loop portion 34 of the belt fasteners 22 therein. The length of the cables 28 extending outward of the slab 52 is short with the leading end 53 of the loop portion 34 of the belt fasteners 22 being maintained within the inwardly curving side portion 58 of the support slab 52. Since the cables 28 slide within respective narrow slot portions 54 upon each belt flexion, with only a narrow space between the cables 28 and their respective belt fastener surfaces 55 which define the narrow slots 54, there is little space for particulates to sift through the splice assembly. The inwardly curved sides 58 of the support slab 52 shield the portions of the cable lengths 28 in proximity with the belt fasteners 22 from particulate which may otherwise accelerate wear of the cables 28.

The length of the cables is dependent upon the radius of curvature which must be traversed by the belt. FIG. 14 illustrates a belt 26 having a splice assembly 20 traversing an arcuate path. Longer cable lengths are better suited for traversing larger radii of curvature, whereas shorter cable lengths are better suited for traversing smaller radii of curvature.

Another embodiment of the invention will now be described in connection with FIGS. 6–8. In this embodiment, the end members 50 fixed to the ends of the cables 28 are inserted into apertures in the belt fasteners 122 by force-fit engagement; and the end members are vertical or perpendicular to the belt, rather than being horizontal and in the plane of the belt as in FIGS. 1–5.

Figure 6:
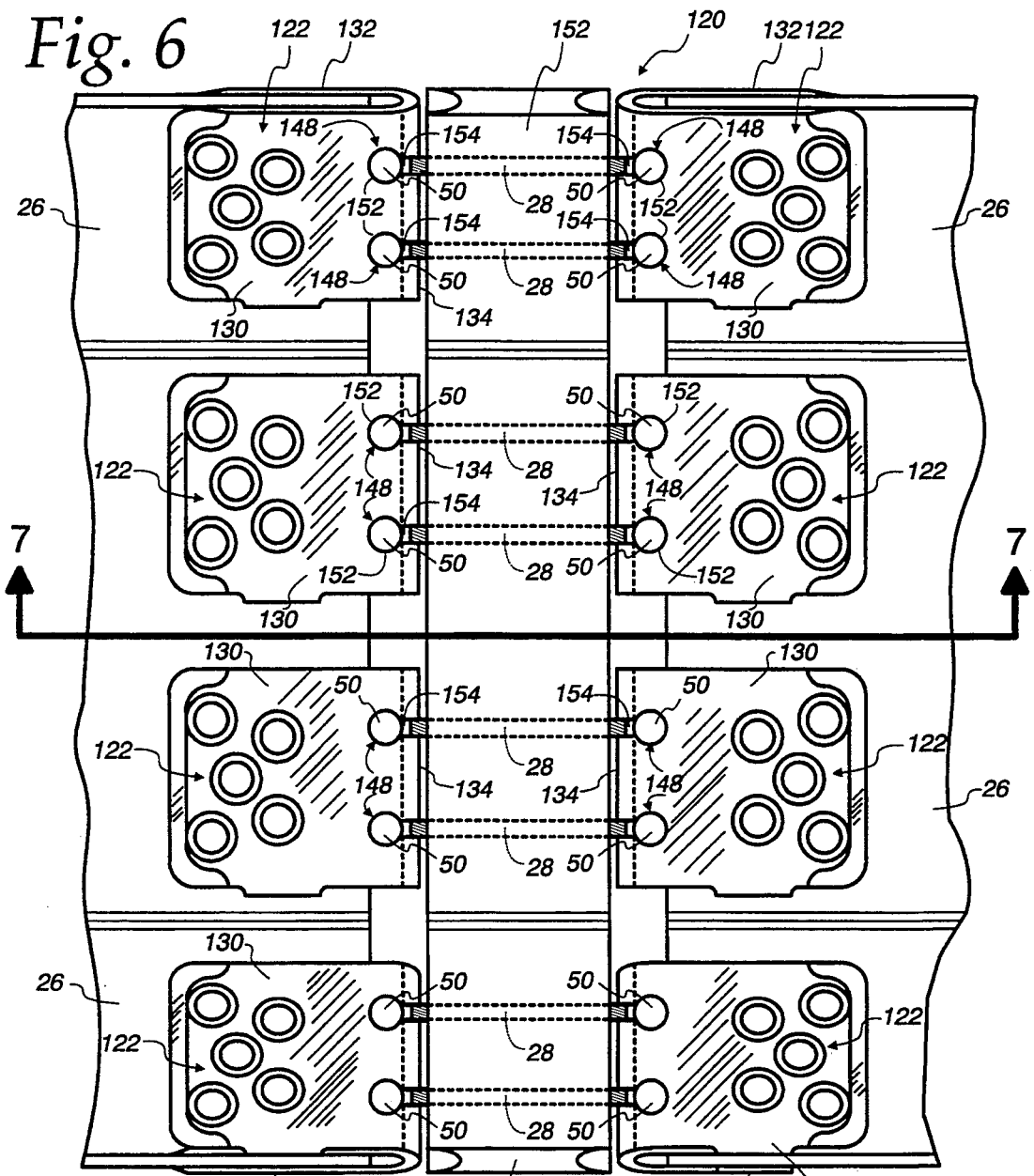
FIG. 6 is a top plan view of an alternative embodiment cable splice embodying various features of the present invention.
Figure 7:
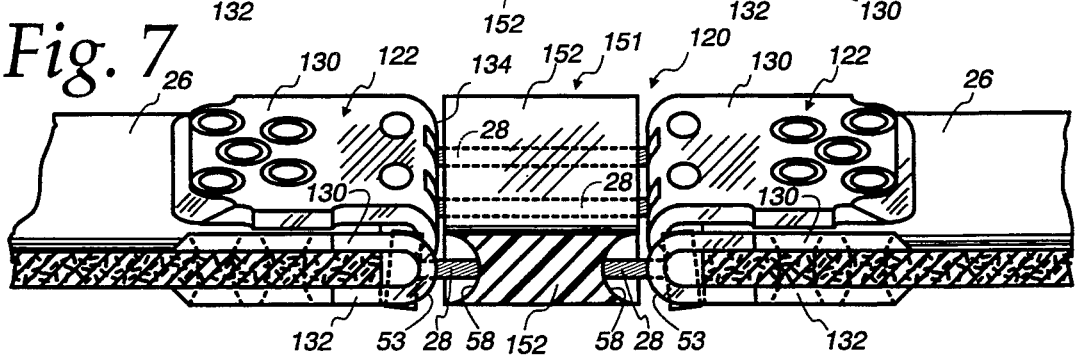
FIG. 7 is a sectional view of the splice assembly taken along line 7—7 of FIG. 6.

With reference to FIGS. 6–8, the belt fasteners 122 employed in this embodiment are very similar to the belt fasteners 22 employed in the previously described embodiment, and are attached to the ends 24 of the belt 26 in the manner described pertaining to the belt fasteners 22 of the other embodiment of FIGS. 1–5 and 14. In this embodiment, circular apertures 152 are formed in both the upper and lower plates 130 and 132, each aperture having a diameter proportioned slightly smaller than the diameter of the aforementioned cylindrical end members 50 fixed to the ends of the cables 28. Thus, the end members 50 may be driven into a force-fit into the apertures 152 of both the upper and lower plates 130 and 132 to securely engage the end members to respective belt fasteners 122. The slots 148 further include a narrow slot portion 154 extending about the loop portion 134 of the belt fasteners 122, from the circular aperture 152 in the upper plate 130 to the circular aperture 152 in the lower plate 132. The narrow slot portion 154 accommodates the cable 28 therein. Accordingly, each cable 28 is secured to a respective belt fastener 122 at both its ends in a manner which prevents movement of the cable ends with respect to the belt fasteners 122.

The aforementioned arrangement of a plurality of cables 28 extending parallel to one another through a support slab 52 allows for picking up a plurality of cables 28 at one time, rather than having to pick up each of the cables 28 individually, and also allows for placement of a group of end members 50 in registration with respective slots 148 for driving of the end members 50 into their respective apertures 152, rather than separately handling and driving each cable and its end members individually.

It has been found to be difficult to force-fit the end members 50 into both the upper and lower apertures 152 of their respective belt fasteners 122. That is, as an end member 50 is force-fit through the upper aperture 152 in the upper plate 130, the upper aperture guides further advancement of the end member 50 and the open top plate is driven down to pivot about its loop in an arcuate path. Hence, the lower end of the end member 50 may not be in alignment with the aperture 152 in the lower plate 132 when advanced thereto.

To assure accurate passage of the end members 50 into the apertures 152 in both the upper and lower plates 130 and 132, so that the end members 50 register with their respective apertures 152 in the lower plates 132 when force-fitted into their respective apertures in the upper plates 130, inserts 160 may be employed to guide the end members 50.

The insert 160 of the preferred embodiment is illustrated in FIGS. 9–12. As best seen in FIG. 9A, inserts 160 are disposable between the upper and lower plates 130 and 132 of each of the belt fasteners 122 adjacent the loop portion 134 of the belt fasteners 122. Hence, the insert is shaped and proportioned in relation to splice assembly 120 into which it is to be inserted. The insert has a rounded front surface 162 and a flat back surface 164, giving the insert 160 the D-shaped profile illustrated in FIG. 10. The inserts 160 have a pair of apertures 162 therethrough which guide respective end members 50 from the aperture 152 in the upper plate 130 into the aperture 152 in the lower plate 130. That is, when the insert 160 is inserted within the belt fastener 122 as shown in FIG. 9A, the apertures 166 in the insert 160 register with the apertures 152 in both the upper and lower plates 130 and 132 of the splice assembly 120 to provide a controlled path of travel of the end members 50 forced therethrough. The insert 160 is placed with its upper side 168 adjacent the upper plate 130, its lower side 170 adjacent the lower plate 132, and its rounded front side 162 adjacent the lower portion 134.

The inserts 160 are preferably formed of a suitable plastic/material such as nylon or the like for low friction sliding of the end members 50 through the apertures 166. The illustrated insert 160 further includes a pair of notches 168 in the rounded front surface 162 for accommodating the cables 28 therein when the belt flexes longitudinally.

From the foregoing, it will be seen that the present invention allows replacement of the conventional hinge pin between belt fasteners with a plurality of cable splices that connect opposing belt fasteners. The cable splice preferably has a plurality cables embedded in a plastic body that prevents sifting of conveyed material between the belt fasteners at the splice. The cable splice allows the belt fasteners to pivot relative to one another as do conventional hinged belt fasteners as the splice travels about drums at the ends of the conveyor runs. Preferably, individual cable splices interconnect only opposed pairs of belt fasteners leaving the space between belt fasteners to be bent to form a longitudinal trough in the belt. This also allows replacement of a single splice assembly if it becomes damaged or breaks while leaving the other splice assemblies intact and in place holding the belt ends together. While in the illustrated embodiment of the invention, the belt splice connects only a pair of opposed belt fasteners, the cable splice could have four or more cables to connect several side-by-side belt fasteners on each end of the belt. Also, in the illustrated embodiment of the invention, there is one end member for each cable end and it is possible that two or more cable ends could be connected to a single end member. The illustrated slab serves as a cover to cover and protect the cables embedded therein. The means to cover the cables need not be a slab, and the cables need not be embedded therein.

What is claimed is:

1. In a conveyor belt, the combination comprising:
   a belt having first and second ends spliced together into an endless belt;

first belt fasteners secured across the first belt end and being spaced to allow troughing of the belt between the first belt fasteners;

second belt fasteners secured across the second belt end and being spaced to allow troughing of the belt between the second belt fasteners;

a plurality of belt splices each extending between a pair of first and second belt fasteners and interconnecting the belt fasteners to form therewith the splice to form the endless belt;

cables in the belt splices extending between the respective first and second belt fasteners and having opposite ends connected to the first and second belt fasteners with the cables taking tension loads between the respective belt ends;

and covers for the belt splices covering the cables to protect the cables from abrasion or snagging and for reducing the amount of sifting of material from the conveyor belt and through the belt splices.

2. In the conveyor belt of claim 1, the cover comprising a slab covering most of the length of the cables which have their opposite ends projecting from the slab; and end members on the respective end of the cables for connection to the respective first and second belt fasteners.

3. In the conveyor belt of claim 2, each slab comprising a body of plastic with a plurality of cables embedded therein, the end member being separately attached to each end of each cable, and a plurality of spaced separate slots in each of the first and second belt fasteners through which a cable end extends to position its end members inside of the respective first and second belt fasteners.

4. In the conveyor belt of claim 1, the first and second belt fasteners having a pair of upper and lower plates with vertically disposed openings in the respective plates, a loop in the belt fasteners connecting the upper and lower plates and having a slot therein through which extends a cable, and end members on the cables extending vertically in the first and second belt fasteners and projecting into the openings in the upper and lower plates to transfer loads to and from the belt fastener plates.

5. In the conveyor belt of claim 1, the cover for the cables being a slab with a plurality of cables embedded therein, ends of the cables protruding from the slab, separate end members on each of the ends of the respective cables for connecting its associated cable to the respective first and second belt fasteners, each of the first and second belt fasteners having upper and lower plates secured to a belt end and having an open loop between the upper and lower plates, and a plurality of end members associated with each slab being positioned horizontally in each open loop.

6. A conveyor belt in accordance with claim 2 in which the plate fasteners are made of metal, the slab is a molded plastic body, and the cables are steel wire ropes.

7. A splice assembly for connecting together opposing first and second ends of a belt, the splice assembly comprising:

first belt fasteners for connection to the first belt end;

second belt fasteners for connection to the second belt end; and a cable splice for interconnecting the respective first and second belt fasteners;

a plurality of cables in the cable splice having opposite ends for connection to the respective first and second belt fasteners; and a cover means for the belt cables in the cable splice, the cover means having means for substantially covering the cables across the space between the first and second belt fasteners against abrasion and snagging, and for reducing the sifting of material through the splice assembly.

8. A splice assembly in accordance with claim 7 in which the cover means comprises a slab of plastic with the cable embedded therein, and end members fixed to opposite ends of the cables and connected to the respective first and second belt fasteners.

9. A splice assembly in accordance with claim 8 in which the cables are formed of strands of metal wire, the ends of the wires being splayed, and the end members are metal members molded about the cable ends with the splayed wire ends embedded in the metal end members.

10. A splice assembly in accordance with claim 9 in which the first and second belt fasteners have upper and lower plates for disposition against upper and lower sides of the belt, apertures are formed in the upper and lower plates, and the end members extend vertically between the upper and lower plates and extend into the apertures therein.

11. A splice assembly in accordance with claim 9 in which the first and second belt fasteners have upper and lower plates and a loop joining the upper and lower plates, and the end members on the cables are for disposition horizontally within the loops of the belt fasteners.

12. A splice assembly in accordance with claim 11 in which openings in the lower plate admitted the end members into the loop and in which slots in the lower portion of the loop allow the ends of the cables to pass through the loops.

13. A splice assembly in accordance with claim 8 wherein the slab is flexible to allow bending of the slab about conveyor drive drums.

14. A splice assembly in accordance with claim 8 wherein the slab curves inwardly at said opposite ends of the slab from which the cable members extend, and at least a portion of each of the belt fasteners reside within the inwardly curved portion of the slab to reduce exposure to sifting.

15. A cable splice in accordance with claim 8 wherein the slab is made of flexible urethane to bend about driving drums.

16. A belt fastener for use with a cable splice having cables with ends and having at least one end member for connection to the belt fastener, the belt fastener comprising:

a fastener body made of metal, an upper plate on the fastener body having apertures therein to receive a fastener to secure the upper plate to a belt end, a lower plate on the fastener body substantially parallel to the upper plate and having apertures aligned with the apertures in the upper plate to secure the lower plate to a lower side of the belt, a loop on the fastener body connecting the upper and lower plates and for being spaced from a belt end, openings in one of the upper and lower plates to allow passage of a cable end member through the plate into the loop, and a slot in the loop through which the cable projects when the end member is received in the loop.

17. The belt fastener of claim 16 including a plurality of spaced openings in a lower plate of the fastener body to allow passage of spaced cable end members into the loop and a plurality of slots in the loop to receive a plurality of cables therein from the end members in the loop.

18. A belt fastener for use with a cable splice having cables with ends and having at least one end member for connection to the belt fastener, the belt fastener comprising:
- a fastener body made of metal,
- an upper plate on the fastener body having apertures therein to receive a fastener to secure the upper plate to a belt end,
- a lower plate on the fastener body substantially parallel to the upper plate and having apertures aligned with the apertures in the upper plate to secure the lower plate to a lower side of the belt,
- a loop on the fastener body connecting the upper and lower plates and for being spaced from a belt end,
- first holes in the upper plate and aligned, second holes in the lower plate for receiving upper and lower ends of a vertically positioned end member within the loop, and at least one slot in the loop to allow the cables to extend through the loops from the vertically positioned end member in the fastener body.

19. A belt fastener in accordance with claim 18 in which the first and second holes are sized slightly smaller than the end member to have a force bit therewith.

20. A belt fastener in accordance with claim 19 including aligning means in the loop for aligning upper and lower ends of the end members with the first and second holes.

21. A cable splice for interconnecting belt fasteners secured to opposing ends of a belt, the cable splice comprising:
- a body of resilient material having a first side for being positioned adjacent a first belt fastener and a second opposite side for being positioned adjacent a second opposing belt fastener,
- a plurality of cables in the body extending across the body between the first and second sides of the body with ends of the cables projecting from the respective sides of the body,
- at least one first end member connected to the protruding ends of the cables at one end of the body for connection to a belt fastener, and
- at least one second end member connected to the protruding ends of the cables at the other end of the body for connection to second belt fasteners.

22. A belt splice in accordance with claim 21 in which the ends of the cables are splayed and the respective end members are molded about the splayed ends.

* * * * *